US011504942B2

(12) United States Patent
Madsen et al.

(10) Patent No.: US 11,504,942 B2
(45) Date of Patent: Nov. 22, 2022

(54) TRANSFER SYSTEM FOR A COMPOSITE MATERIAL

(71) Applicant: Dimension-Polyant GmbH, Kempen (DE)

(72) Inventors: Kenneth M. Madsen, Bristol, RI (US); Hale S. Walcoff, Adamsville, RI (US)

(73) Assignee: Dimension-Polyant GmbH, Kempen (DE)

( * ) Notice: Subject to any disclaimer, the term of this patent is extended or adjusted under 35 U.S.C. 154(b) by 242 days.

(21) Appl. No.: 16/480,005

(22) PCT Filed: Jan. 19, 2018

(86) PCT No.: PCT/EP2018/051337
§ 371 (c)(1),
(2) Date: Jul. 23, 2019

(87) PCT Pub. No.: WO2018/138015
PCT Pub. Date: Aug. 2, 2018

(65) Prior Publication Data
US 2019/0366679 A1 Dec. 5, 2019

(30) Foreign Application Priority Data

Jan. 24, 2017 (DE) .......................... 102017101301.6

(51) Int. Cl.
| *B32B 5/26* | (2006.01) |
| *B32B 5/02* | (2006.01) |
| *B32B 7/12* | (2006.01) |
| *B32B 7/06* | (2019.01) |
| *B32B 5/12* | (2006.01) |
| *B63H 9/06* | (2020.01) |
| *B63H 9/067* | (2020.01) |

(52) U.S. Cl.
CPC ............... *B32B 5/26* (2013.01); *B32B 5/022* (2013.01); *B32B 5/12* (2013.01); *B32B 7/06* (2013.01); *B32B 7/12* (2013.01); *B63H 9/067* (2020.02); *B32B 2262/0253* (2013.01); *B32B 2262/0261* (2013.01); *B32B 2262/0269* (2013.01); *B32B 2262/0276* (2013.01); *B32B 2262/106* (2013.01); *B32B 2307/538* (2013.01); *B32B 2307/744* (2013.01); *B32B 2605/12* (2013.01)

(58) Field of Classification Search
CPC .. B32B 5/26; B32B 5/022; B32B 5/12; B32B 7/12; B32B 7/06; B32B 2307/744; B32B 2307/538; B32B 2605/12; B32B 2262/0253; B32B 2262/106; B32B 2262/0276; B32B 2262/0269; B32B 2262/0261; B63H 9/0657
See application file for complete search history.

(56) References Cited

U.S. PATENT DOCUMENTS

| 4,454,184 A | 6/1984 | Britton | |
| 4,539,254 A * | 9/1985 | O'Connor | B32B 7/12 442/35 |
| 4,749,609 A * | 6/1988 | Lempereur | B32B 5/28 428/105 |
| 4,945,848 A * | 8/1990 | Linville | B32B 7/12 428/110 |
| 6,901,712 B2 * | 6/2005 | Lionel | B32B 7/14 428/40.1 |
| 2013/0280476 A1 * | 10/2013 | Davis | B32B 5/022 428/109 |

FOREIGN PATENT DOCUMENTS

| WO | 0023320 A2 | 4/2000 |
| WO | 2013148696 A1 | 10/2013 |
| WO | 2014047663 A1 | 3/2014 |

OTHER PUBLICATIONS

International Search Report and Translation Application No. PCT/EP2018/051337 Completed: Mar. 26, 2018; dated Apr. 5, 2018 7 pages.
Written Opinion of the International Searching Authority & Translation Application No. PCT/EP2018/051337 Completed: Mar. 26, 2018; dated Apr. 5, 2018 9 pages.

* cited by examiner

*Primary Examiner* — Jeremy R Pierce
(74) *Attorney, Agent, or Firm* — Whitmyer IP Group LLC

(57) ABSTRACT

A transfer system for a composite material including: a nonwoven as carrier material and a textile layer of reinforcing fibers, wherein the reinforcing fibers consist of mono- or multifilaments or tapes and the carrier material is adhesively bonded to the layer of reinforcing fibers.

16 Claims, No Drawings

TRANSFER SYSTEM FOR A COMPOSITE MATERIAL

TECHNICAL FIELD

The invention relates to a transfer system for composite material comprising a cover foil, a carrier material consisting of a nonwoven and a textile layer of reinforcing fibers, in particular multifilaments. The composite material is particularly suitable for use in rigid composites such as surfboards, skis, etc., as well as in flexible composites such as sailcloth laminates and membranes.

BACKGROUND

Nonwovens are frequently employed to improve the properties of area-measured/sheet materials. They improve, for example, the breaking and tearing resistance, prevent the propagation of cracks, increase impact strength and enhance the visual appearance. The open porosity of the nonwovens has a positive effect on the permeation of the binding agents contained in the composite.

Reinforcing fibers are used in packaging materials and engineered products to increase tensile strength, impact strength, stiffness and processing compatibility. In combination with nonwoven fabrics, improvements are achieved that result from the combination of the properties of both materials. A composite of polyester films and reinforcing fibers has proven itself for sports sailing purposes.

So-called scrims are also employed to enhance the roughness and grip of surfaces. For example, scrims are applied to the surface of surfboards with a view to improving grip/skid resistance.

As a rule, fiber reinforcements are applied to area-measured/sheet material directly during production by mechanically inserting the respective fibers into an adhesive bed. The incorporation of a fiber reinforcement into an adhesive bed is usually associated with inaccuracies that do not serve the intended purpose, which is, for example, to absorb the tensile forces arising in a sail. In this case, it would be desirable to be able to introduce a fiber reinforcement into the area-measured/sheet material with precise alignment and in a tight form.

A latticework made of several adhesively bonded fiber layers is known from the publication WO 2013/148696 A1, said latticework being usable for the modification of surfaces. The production is rather sophisticated and the adhesion of the different fiber layers with each other is limited.

Therefore, there is a need for systems by means of which a latticework of reinforcing fibers can simply be produced in a form conducive to application and transferred to a surface. Such a system shall in particular ensure that the application of the reinforcing fibers can be carried out precisely, i.e. without distortion and in a tight form, and results in a permanent fixation of said fibers. The system should be applicable and adaptable to a plurality of different kind of surfaces.

SUMMARY

This objective is achieved by means of a transfer system for a composite material of the kind first mentioned above, said composite having reinforcing fibers that consist of monofilaments or multifilaments or tapes, with the nonwoven material serving as carrier being adhesively bonded to the layer of reinforcing fibers. To facilitate handling, the composite material can be provided with a cover foil capable of being stripped off.

Preferably, the textile layer comprises reinforcing fibers intersecting with each other.

The transfer system may also comprise a layer of parallelly extending reinforcing fibers, preferably in the machine direction, as well as a combination of reinforcing fibers running parallelly and intersecting with each other. In this case, for example, the fibers extend at an angle of 0°, +45° and −45° to the machine direction. Angles deviating from 0° and 90° are referred to as off-angles.

DETAILED DESCRIPTION

As proposed by the present invention, a cover foil is a foil which serves for the protection of the composite of nonwoven material and textile reinforcing fibers and which can be easily removed from the composite before, during or after its application. Accordingly, the cover foil does not form an integral part of the composite. The inventive transfer system may be provided with one or two cover foils, in the latter case one on each side. Provided the composite material has sufficient dimensional stability, a cover foil can be dispensed with.

In the case of the composite material proposed by the invention the carrier material (nonwoven) and the applied textile layer of reinforcing fibers are adhesively bonded to each other. In the event the nonwoven consists of thermoplastic plastic material such as fibers made of polyamide, polyester, polyolefin, etc., which develop a sufficient adhesive property when heated, this adhesive property can be made use of for fixation purposes. In other cases, for example when carbon fibers or mineral fibers (glass fibers, stone fibers) are used, the carrier material must be provided with a suitable binder before or during application. The application of the textile layer consisting of reinforcing fibers without binding agent takes place at elevated temperature. The carrier material should regain its essential properties after it has cooled down and the reinforcing fibers should not be adversely impaired during the adhesive bonding process. In this way, an attractive and smooth surface is created on the carrier material side after application.

As claimed by the invention, the reinforcing fibers consist of multifilaments, i.e. a plurality of individual fibers which essentially extend parallelly. The fibers may be of twisted configuration, but do not have to be. Multifilaments made from a plurality of individual fibers offer advantages in that their points of intersection can be kept flat resulting in the thickness of the composite being low. The use of monofilaments and tape-like materials is also possible.

Basically, any desired material can be used for the cover foil, provided it has release properties and can be easily removed from the composite. For example, polyolefins, in particular polyethylene and polypropylene, can be used for the purpose. Such cover foils, for example, have a thickness ranging between 0.1 and 0.4 mm. Cover foils can be arranged on only one or on both sides of the composite consisting of nonwoven and textile layer and allow the composite material to be produced in the form of a web capable of being rolled up. It is also possible to provide the layer of reinforcing fibers with a nonwoven material on both sides. In this case the cover foil can be arranged on one or on both sides.

For example, the cover foil may be used as a basis in the production process on which the composite comprising nonwoven material and reinforcing fibers is manufactured.

However, another possibility is to bring cover foil and composite together in the course of the manufacturing process.

Preferably, the carrier material (nonwoven) has a thickness of between 0.020 and 0.070 mm and in particular between 0.030 and 0.060 mm. It should bring to bear its adhesive properties at a temperature in the range of between 80 and 180° C., in particular at about 100° C. The carrier material preferably comprises a thermoplastic fiber material that forms an adhesive bond when heated, in particular a polyamide.

Reinforcing fibers of the textile layer intersecting with one another are preferably arranged in individual layers comprising groups of parallelly extending filaments. The distance between the filaments is 0.3 to 11.5 cm, in particular approx. 2 cm. In order to obtain a lattice structure, the different layers are arranged in such a way that the groups intersect with each other, preferably off-angle (not at right angles). Preferred are intersecting angles between 40° and 140°, with the exclusion of the 85° to 95° range. Said spacing and the intersecting angle depend on the strength requirements to be met as well as the yarn thickness itself, i.e. when yarn of high yarn count is used the space between the individual strands may be high and vice versa. For example, the strand denier density can be 18,000 dpi (denier per inch), which, for instance, may be divided into 18 strands per inch width of 1,000 deniers each. As a rule, a strand denier density ranging between 500 and 7,500 dpi in each yarn layer will be sufficient, in particular a density of between 1,000 and 6,000 dpi.

For the reinforcing fibers customary materials are used, in particular those employed for the manufacture of composites, in sports sailing, or for packaging purposes, such as aramid, carbon, polyester, polyolefin, polyamide. Multifilament yarns made of UHMWPE (e.g. Dyneema®) and aramid (e.g. Technora Black®, Twaron®) have proved particularly useful. The use of tape-like material based on UHMWPE (e.g. EnduMax®) is also possible. Depending on the number of filament groups, the textile layer consists of the corresponding number of individual layers.

In the transfer system proposed by the invention, the reinforcing fibers in the textile layer form a lattice structure. Lattice structure in this context means that at least two groups of filaments intersect with each other. However, other groups may also be present, for example a group extending in the machine direction and two other groups intersecting at an angle of 60° and 120°.

The inventive transfer system manufactured can be of small thickness, for example having a thickness of less than 0.3 mm. The thickness of the composite of nonwoven and reinforcing fibers in this case can be less than 0.2 mm. The respective thickness, however, depends on the requirements to be met for the relevant application.

Normally, the thickness of the composite of the transfer system according to the invention ranges between 0.2 and 0.4 mm, measured at the points of intersection with one or two cover foils. For the composite itself, there are thicknesses that range between 0.15 and 0.25 mm, also at the points of intersection.

For the production of sails, it is a necessity to achieve a very low weight per unit area along with high tensile strength. For example, a composite manufactured according to the invention—without cover foil—can have a weight per unit area of 21 g/m². Such low weights per unit area for a fiber reinforcement are difficult to achieve with reinforcing fibers laid in an adhesive bed. Generally, the weight per unit area of the composite is between 10 and 30 g/m².

The transfer material according to the invention can be easily produced in large quantities and may be manufactured, for example, as roll material with widths of up to 2.0 m and lengths of up to 1,000 m. The roll material can be cut to size as required and may be applied to curved surfaces due to the fact that the composite is highly flexible. It may, in particular, be used for the manufacture of sailcloth and sails and for increasing the roughness of surfaces, for instance of surfboards. Another field of application is the manufacture of packaging materials, which have to meet high requirements in terms of tear resistance and tenacity. The production and cutting to size of reinforcing tapes are also possible.

During application, the inventive composite is laid in an adhesive bed in a known manner, with the cover foil, if arranged on the adhesive side, to be removed in advance and a second cover foil, if present, to be removed after application to the adhesive bed.

The nonwoven of the transfer system proposed by the invention retains its porosity—and thus its permeability for air, adhesive or resin—even in the composite. This allows air to be sucked out of the composite during the production of the laminate by means of vacuum, which is a conventionally employed process resulting in obtaining a more homogeneous laminate. At the same time adhesive or resin can be sucked (infused) into the laminate.

In the manufacture of fiber composite structures, infusion processes play a major role. The inventive transfer system has proven to be well suited for the production of fiber composite structures by means of resin infusion.

Example: A transfer system according to the invention was produced with one and two polypropylene cover foils, which served as strip-off foils, as well as a nonwoven based on polyamide as carrier material and reinforcing fibers. For the purpose of reinforcement, Technora Black® fibers with 750 den were used arranged at an angle of +22° and −22° to the machine direction and with a spacing of 1.9 cm. The thicknesses measured at the points of intersection, with a fiber layer and the carrier material alone, as well as the weights per unit area with and without cover foils, are given in the table below. The sample had a weight per unit area of the composite of 21 g/m². The values indicated are mean values from three measurements.

TABLE

| | Thickness in mm | | | |
| --- | --- | --- | --- | --- |
| | At points of intersection | With a fiber layer | Plastic film | Weight |
| 2 cover foils | 0.238 | 0.189 | 0.127 | 94.0 g/m² |
| 1 cover foil | 0.217 | 0.158 | 0.091 | 57.0 g/m² |
| Composite | 0.160 | 0.114 | 0.045 | 21.0 g/m² |

The invention claimed is:

1. A transfer system for a composite material consisting of:
   a nonwoven as carrier material,
   a textile layer of reinforcing fibers, and
   two cover foils having release properties on each side,
   wherein the reinforcing fibers consist of mono- or multifilaments or tapes and the carrier material is bonded to the layer of reinforcing fibers;
   wherein a weight per unit area of the composite is between 10 and 30 g/m².

2. The transfer system according to claim 1, wherein the textile layer includes reinforcing fibers intersecting with one another.

3. The transfer system according to claim 1, wherein the nonwoven has a thickness of between 0.020 and 0.070 mm.

4. The transfer system according to claim 3, wherein the thickness of the nonwoven is between 0.030 and 0.060 mm.

5. The transfer system according to claim 1, wherein the composite of nonwoven and textile layer of reinforcing fibers is thermally produced at a temperature of less than 180° C.

6. The transfer system according to claim 1, wherein the carrier material and the reinforcing fibers are bonded to one another by a binding agent.

7. The transfer system according to claim 1, wherein the carrier material contains fibers of a thermoplastic material.

8. The transfer system according to claim 7, wherein the fibers of the thermoplastic material are fibers of a polyamide.

9. The transfer system according to claim 1, wherein the textile layer of reinforcing fibers constitutes a latticework of intersecting groups of reinforcing fibers extending parallel to one another, which are arranged in two or more individual layers.

10. The transfer system according to claim 9, wherein the reinforcing fibers of a group extend at a spacing of 0.3 to 11.5 cm from one another.

11. The transfer system according to claim 1, wherein the reinforcing fibers consist of bundles or tapes of aramid, carbon, polyolefin, polyamide and/or polyester fibers.

12. The transfer system according to claim 1, wherein the multifilaments of the reinforcing fibers are twisted.

13. The transfer system according to claim 1 in the form of a roll material.

14. A transfer system comprising,
a composite consisting of;
   (a) a nonwoven as carrier material, and
   (b) a textile layer of reinforcing fibers,
wherein the reinforcing fibers consist of mono- or multi-filaments or tapes and the carrier material is adhesively bonded to the layer of reinforcing fibers, said transfer system for application of the composite of said nonwoven and said textile layer of reinforcing fibers to a surface;
wherein a weight per unit area of the composite is between 10 and 30 g/m$^2$;
wherein the textile layer includes reinforcing fibers intersecting with one another to form points of intersection to increase roughness and/or skid resistance/grip, when applied to the surface.

15. A method of manufacturing a sailcloth or sails, comprising:
using the transfer system according to claim 14.

16. A method of manufacturing packaging films/foils or protective covers, comprising:
using the transfer system according to claim 14.

* * * * *